United States Patent
Daoud et al.

(10) Patent No.: US 12,063,576 B2
(45) Date of Patent: Aug. 13, 2024

(54) SYSTEMS AND METHODS FOR LEVERAGING TEXT MESSAGES IN A MOBILE-BASED CROWDSOURCING PLATFORM

(71) Applicant: CrowdComfort, Inc., Boston, MA (US)

(72) Inventors: Abdullah Daoud, Lynnfield, MA (US); B. Eric Graham, Wenham, MA (US)

(73) Assignee: CrowdComfort, Inc., Boston, MA (US)

( * ) Notice: Subject to any disclaimer, the term of this patent is extended or adjusted under 35 U.S.C. 154(b) by 0 days.

(21) Appl. No.: 18/135,081

(22) Filed: Apr. 14, 2023

(65) Prior Publication Data
US 2023/0254670 A1 Aug. 10, 2023

Related U.S. Application Data

(63) Continuation of application No. 17/710,449, filed on Mar. 31, 2022, now Pat. No. 11,632,656, which is a continuation of application No. 16/538,084, filed on Aug. 12, 2019, now Pat. No. 11,323,853, which is a continuation of application No. 16/120,422, filed on Sep. 3, 2018, now Pat. No. 10,382,911, which is a continuation of application No. 15/429,624, filed on Feb. 10, 2017, now Pat. No. 10,070,280.

(60) Provisional application No. 62/294,343, filed on Feb. 12, 2016.

(51) Int. Cl.
| | |
|---|---|
| *H04W 4/14* | (2009.01) |
| *H04B 17/318* | (2015.01) |
| *H04W 4/029* | (2018.01) |
| *H04W 4/33* | (2018.01) |

(52) U.S. Cl.
CPC ............ *H04W 4/14* (2013.01); *H04W 4/029* (2018.02); *H04W 4/33* (2018.02); *H04B 17/318* (2015.01); *H04M 2250/10* (2013.01)

(58) Field of Classification Search
CPC ....... H04W 4/02; H04W 4/029; H04W 4/021; H04W 4/027; H04W 4/023
See application file for complete search history.

(56) References Cited

U.S. PATENT DOCUMENTS

| | | | | |
|---|---|---|---|---|
| 8,929,849 B1* | 1/2015 | Dudziak | ............ | H04M 11/066 455/466 |
| 2011/0218839 A1* | 9/2011 | Shamaiengar | ..... | G06Q 30/0641 705/7.32 |
| 2012/0013475 A1* | 1/2012 | Farley | ..................... | G01C 5/06 340/665 |

(Continued)

*Primary Examiner* — Dung Hong
(74) *Attorney, Agent, or Firm* — Nutter McClennen & Fish LLP (57) ABSTRACT

The present invention includes a system for providing a mobile-based crowdsourcing platform configured to provide an intuitive and semi-automated means of collecting and managing user-driven data by leveraging text messages. The crowdsourcing platform is configured to leverage a Short Message Service (SMS) communication system for generating and transmitting command text messages to mobile devices of users of the service. The command text messages essentially elicit or otherwise train/educate the user's mobile device to automatically transmit requested data back to the crowdsourcing platform, the requested data including the location or position of the user within a given environment.

20 Claims, 6 Drawing Sheets

(56) References Cited

U.S. PATENT DOCUMENTS

| | | | | |
|---|---|---|---|---|
| 2013/0030955 A1* | 1/2013 | David | .................... | G06Q 50/12 |
| | | | | 705/26.8 |
| 2013/0132438 A1* | 5/2013 | Park | .................... | G06F 16/2468 |
| | | | | 707/780 |
| 2013/0244686 A1* | 9/2013 | Saha | .................... | G06F 1/3293 |
| | | | | 455/456.1 |
| 2013/0304894 A1* | 11/2013 | Kim | .................... | H04M 3/5116 |
| | | | | 709/223 |
| 2014/0074743 A1* | 3/2014 | Rademaker | ........ | G06Q 30/0601 |
| | | | | 705/334 |
| 2014/0236759 A1* | 8/2014 | Mirabile | ............ | G06Q 30/0633 |
| | | | | 705/26.8 |
| 2014/0278089 A1* | 9/2014 | Gusikhin | ............ | G01C 21/362 |
| | | | | 701/538 |
| 2014/0279270 A1* | 9/2014 | Bertanzetti | ........ | G06Q 30/0635 |
| | | | | 705/26.81 |
| 2015/0032264 A1* | 1/2015 | Emmons | .............. | F24F 11/0001 |
| | | | | 700/276 |
| 2015/0088575 A1* | 3/2015 | Asli | ................ | G06Q 10/06314 |
| | | | | 705/7.19 |
| 2016/0044467 A1* | 2/2016 | Clausen | .................. | H04W 4/33 |
| | | | | 455/457 |
| 2016/0174032 A1* | 6/2016 | Xin | ......................... | H04W 4/21 |
| | | | | 455/456.3 |
| 2016/0210647 A1* | 7/2016 | Chang | .................... | H04W 4/02 |
| 2016/0350837 A1* | 12/2016 | Williams | ............... | G06Q 50/12 |

\* cited by examiner

SYSTEMS AND METHODS FOR LEVERAGING TEXT MESSAGES IN A MOBILE-BASED CROWDSOURCING PLATFORM

CROSS REFERENCE TO RELATED APPLICATIONS

This application is a continuation of U.S. application Ser. No. 17/710,449 entitled SYSTEMS AND METHODS FOR LEVERAGING TEXT MESSAGES IN A MOBILE-BASED CROWDSOURCING PLATFORM filed Mar. 31, 2022 (U.S. Pat. No. 11,632,656 issuing Apr. 18, 2023), which is a continuation of U.S. application Ser. No. 16/538,084 entitled SYSTEMS AND METHODS FOR LEVERAGING TEXT MESSAGES IN A MOBILE-BASED CROWDSOURCING PLATFORM filed Aug. 12, 2019 (now issued as U.S. Pat. No. 11,323,853 issued May 3, 2022), which is a continuation of U.S. application Ser. No. 16/120,422 entitled SYSTEMS AND METHODS FOR LEVERAGING TEXT MESSAGES IN A MOBILE-BASED CROWDSOURCING PLATFORM filed Sep. 3, 2018 (now issued as U.S. Pat. No. 10,382,911), which is a continuation of U.S. application Ser. No. 15/429,624 entitled SYSTEMS AND METHODS FOR LEVERAGING TEXT MESSAGES IN A MOBILE-BASED CROWDSOURCING PLATFORM filed Feb. 10, 2017 (now issued as U.S. Pat. No. 10,070,280), which claims the benefit of, and priority to, U.S. Provisional Application No. 62/294,343, filed Feb. 12, 2016, the contents of each of which are incorporated by reference herein in their entireties.

FIELD OF THE INVENTION

The present disclosure relates generally to management systems and methods, and, more particularly, to a system for providing a mobile-based crowdsourcing platform configured to provide an intuitive and semi-automated means of collecting and managing user-driven data by leveraging text messages.

BACKGROUND

In today's competitive environment, access to immediate information is crucial. With continual advancements in communication technologies, many have become accustomed to, and even expecting, access to instantaneous information and the ability to be constantly available to others. Short Message Service (SMS) is rapidly becoming the messaging medium of choice for larger and larger segments of the public. SMS is a text messaging service utilizing standardized communications protocols for the exchange of text messages to mobile devices, specifically mobile or cellular phones. Accordingly, SMS enables users of mobile devices the benefits of the often limited functions from the world of paging, email, and instant messaging.

The advent of digital cellular, and more particularly SMS, provides numerous benefits to the wireless world that were previously unavailable, thus aiding the population's need for constant information and constant availability. Text messaging is a fast and convenient way to communicate short messages between users of mobile devices. There are also information services that use text messaging to deliver content of interest (e.g., news, weather, sports, financial markets, entertainment) to a base of subscribers. Accordingly, SMS broadcasting is a widely used technology, with more and more companies and service providers communicating to their customers via SMS.

SUMMARY

The present invention provides systems and methods for leveraging text messaging in a mobile-based crowdsourcing platform. In particular, the system of the present invention includes a plurality of remote mobile devices configured to communicate and exchange data with a cloud-based service, such as a crowdsourcing platform, wherein the data is collected based on the exchange of text messages between the crowdsourcing platform and one or more users of the mobile devices. The crowdsourcing platform is configured to provide a number of services, one of which includes the collection of data from one or more users within an environment, particularly with respect to any issues they may report within the environment. For example, in the industry of building maintenance and services, the platform is configured to collect data from patrons or employees within a space, such as an office space, wherein such data may be related to comfort issues such as HVAC (e.g., temperature of a particular room within a building), building maintenance issues (e.g., lighting issues, cleanliness of facilities, etc.), as well as other aspects of a building or space that may be useful in management of such space.

The crowdsourcing platform is configured to leverage a Short Message Service (SMS) communication system for generating and transmitting command text messages to mobile devices of users of the service. The command text messages essentially elicit or otherwise train/educate the user's mobile device to automatically transmit requested data back to the crowdsourcing platform to improve the reporting of any issues related to the environment. The requested data may include, for example, a location of the mobile device at the time of the reporting of any issue. Accordingly, by leveraging text messages, the present invention essentially provides a geolocation service so as to determine location and movement of the users within a specific environment when the users report any issues via their mobile devices, thereby improving the accuracy of issue reporting.

In the embodiments described herein, the environment is an indoor environment, such as an office space. However, it should be noted that the systems and methods of the present invention may be used in outdoor environments. Further, it should be noted that the terms "geolocation" and "positioning" may be used interchangeably herein, particularly when referring to "indoor geolocation" or "indoor positioning".

The location and movement of the users within the office space may be based on user data as captured by one or more sensors on the mobile device, wherein such data includes, but is not limited to, user movement (e.g., GPS measurements, IMU measurements, etc.) as well as signals from the mobile device (e.g., received signal strength (RSS) measurements, RF measurements, etc.). For example, a user may subscribe to services provided by the crowdsourcing platform so as to authorize data to be automatically pushed from their mobile device to the platform. A user may report, via text message, an issue within the environment (e.g., report that a room is too hot or cold). In response to receipt of the reporting text message, the crowdsourcing platform may be configured to transmit a command text message to the user's mobile device, wherein the command text message is configured to command the user's mobile device to generate and send a text message, including location/positioning data, back to the crowdsourcing platform to be processed and correlated with the reported issue. In some embodiments, direct user input may be received (e.g., users be prompted to verify their location or movement, as well as specific landmarks or objects within the vicinity) so as to improve the degree of certainty of a user's position within the office space when reporting an issue.

The present invention provides numerous advantages over current geolocation systems and methods. In particular, the system does not require a user to proactively provide their exact location within an environment when reporting any issues within the environment. Rather, the system is able to automatically communicate with and elicit location/position data, or otherwise train/educate a user's mobile device to provide location/position data, from the user's mobile device without the need for the user to participate, other than providing an initial reporting of an issue, in some instances. Furthermore, user interaction and communication may significantly improve with the implementation of text messaging, thereby improving the overall user experience, as well as creating a more robust platform for data collection and exchange.

It should be noted that the crowdsourcing platform of the present disclosure is not limited to providing services solely related to comfort or maintenance issues in a building or office space. For example, the crowdsourcing platform may be useful in a consumer-based service application, such as in the food industry or the like in which users may utilize their mobile device to interact with an ordering application to order food-related items to be subsequently picked up by the user or delivered to the user. For example, a restaurant, eatery, or other food-related business, may offer a mobile app that allows a consumer to, via their mobile device, place an order for a food item in advance of their intended arrival to pick up the food item. By incorporating the crowdsourcing platform of the present disclosure, the restaurant or eatery may be able to better estimate the consumer's actual position relative to the location of the establishment, thereby improving the management of processing multiple orders. In particular, by automatically receiving any given consumer's location relative to the location of the restaurant or eatery, the actual processing of the queue of online orders can be better managed so as to better align with the estimated timeframe in which consumers will physically arrive at the establishment to pick up their orders. For example, a consumer who ordered a cup of coffee via their mobile device may be traveling in their vehicle and may encounter traffic on their way to the restaurant to pick up their coffee. The restaurant can receive the actual location of that consumer via the crowdsourcing platform and, based on the location/position data, may alter the queue of orders such that the consumer's cup of coffee may be processed later in the queue than originally intended so as to account for the consumer's delayed arrival. In this manner, other consumers who may be present at the restaurant, or are otherwise not delayed will have their orders processed in a more timely manner, while the consumer arriving later than intended (due to traffic) will have a cup of coffee that processed in accordance with their estimated arrival (i.e., a warm cup of coffee), thereby improving consumer satisfaction and retention.

BRIEF DESCRIPTION OF THE DRAWINGS

Features and advantages of the claimed subject matter will be apparent from the following detailed description of embodiments consistent therewith, which description should be considered with reference to the accompanying drawings.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

The present invention provides systems and methods for leveraging text messaging in a mobile-based crowdsourcing platform. In particular, the system of the present invention includes a plurality of remote mobile devices configured to communicate and exchange data with a cloud-based service, such as a crowdsourcing platform, wherein the data is collected based on the exchange of text messages between the crowdsourcing platform and one or more users of the mobile devices. The crowdsourcing platform is configured to provide a number of services, one of which includes the collection of data from one or more users within an environment, particularly with respect to any issues they may report within the environment. For example, in the industry of building maintenance and services, the platform is configured to collect data from patrons or employees within a space, such as an office space, wherein such data may be related to comfort issues such as HVAC (e.g., temperature of a particular room within a building), building maintenance issues (e.g., lighting issues, cleanliness of facilities, etc.), as well as other aspects of a building or space that may be useful in management of such space.

The crowdsourcing platform is configured to leverage a Short Message Service (SMS) communication system for generating and transmitting command text messages to mobile devices of users of the service. The command text messages essentially elicit, or otherwise train/educate the user's mobile device to automatically transmit requested data back to the crowdsourcing platform to improve the reporting of any issues related to the environment. The requested data may include, for example, a location of the mobile device at the time of the reporting of any issue. Accordingly, by leveraging text messages, the present invention essentially provides a geolocation service so as to determine location and movement of the users within a specific environment when the users report any issues via their mobile devices, thereby improving the accuracy of issue reporting.

In the embodiments described herein, the environment is an indoor environment, such as an office space. However, it should be noted that the systems and methods of the present invention may be used in outdoor environments. Further, it should be noted that the terms "geolocation" and "positioning" may be used interchangeably herein, particularly when referring to "indoor geolocation" or "indoor positioning".

The location and movement of the users within the office space may be based on user data as captured by one or more sensors on the mobile device, wherein such data includes, but is not limited to, user movement (e.g., GPS measurements, IMU measurements, altimeter and magnetometer measurements, etc.) as well as signals from the mobile device (e.g., received signal strength (RSS) measurements, RF measurements, etc.). For example, a user may subscribe to services provided by the crowdsourcing platform so as to authorize data to be automatically pushed from their mobile device to the platform. A user may report, via text message, an issue within the environment (e.g., report that a room is too cold). In response to receipt of the reporting text message, the crowdsourcing platform may be configured to transmit a command text message to the user's mobile device, wherein the command text message is configured to command the user's mobile device to generate and send a text message, including location/positioning data, back to the crowdsourcing platform to be processed and correlated with the reported issue. In some embodiments, direct user input may be received (e.g., users be prompted to verify their location or movement, as well as specific landmarks or objects within the vicinity) so as to improve the degree of certainty of a user's position within the office space when reporting an issue.

The present invention provides numerous advantages over current geolocation systems and methods. In particular, the system does not require a user to proactively include their exact location within an environment when reporting any issues within the environment. Rather, the system is able to automatically communicate with and elicit location/position data, or otherwise train/educate a user's mobile device to provide location/position data, from the user's mobile device without the need for the user to participate, other than providing an initial reporting of an issue, in some instances. Accordingly, the precise location of a reported issue can be obtained with little or no input required from the user. Furthermore, the configuration of the system of the present invention may reduce or even entirely eliminate the specific hardware requirements (e.g., beacon-like devices) that are required in current systems and methods.

Although the following description focuses on an environment within a building or office space, it should be noted that the crowdsourcing platform of the present disclosure is not limited to providing services solely related to comfort or maintenance issues in a building or office space. For example, the crowdsourcing platform may be useful in a consumer-based service application, such as in the food industry or the like in which users may utilize their mobile device to interact with an ordering application to order food-related items to be subsequently picked up by the user or delivered to the user. For example, a restaurant, eatery, or other food-related business, may offer a mobile app that allows a consumer to, via their mobile device, place an order for a food item in advance of their intended arrival to pick up the food item. By incorporating the crowdsourcing platform of the present disclosure, the restaurant or eatery may be able to better estimate the consumer's actual position relative to the location of the establishment, thereby improving the management of processing multiple orders. In particular, by automatically receiving any given consumer's location relative to the location of the restaurant or eatery, the actual processing of the queue of online orders can be better managed so as to better align with the estimated timeframe in which consumers will physically arrive at the establishment to pick up their orders. For example, a consumer who ordered a cup of coffee via their mobile device may be traveling in their vehicle and may encounter traffic on their way to the restaurant to pick up their coffee. The restaurant can receive the actual location of that consumer via the crowdsourcing platform and, based on the location/position data, may alter the queue of orders such that the consumer's cup of coffee may be processed later in the queue than originally intended so as to account for the consumer's delayed arrival. In this manner, other consumers who may be present at the restaurant, or are otherwise not delayed will have their orders processed in a more timely manner, while the consumer arriving later than intended (due to traffic) will have a cup of coffee that processed in accordance with their estimated arrival (i.e., a warm cup of coffee), thereby improving consumer satisfaction and retention.

Figure 1:
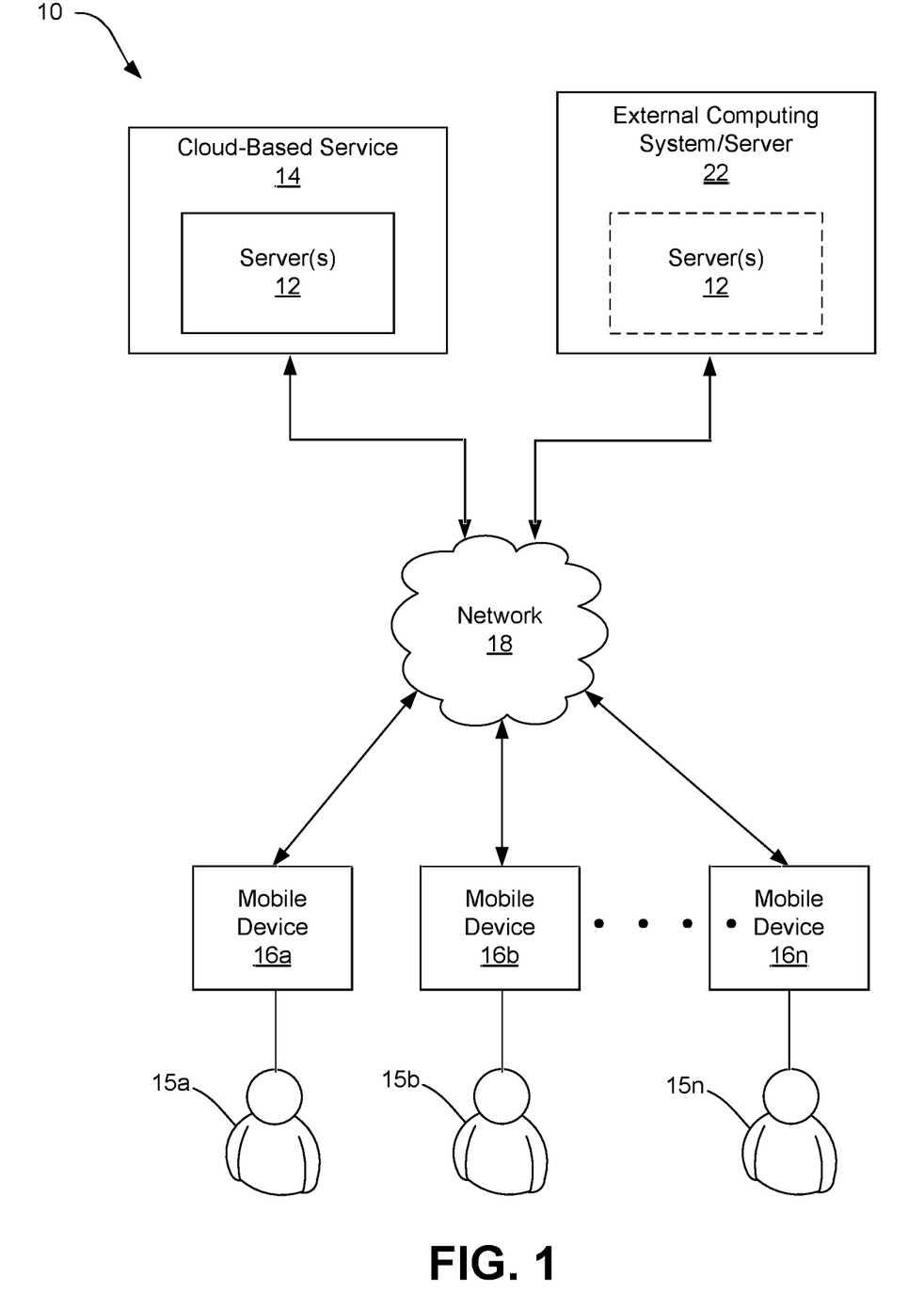
FIG. 1 is a block diagram illustrating one embodiment of an exemplary system for geolocation services in a mobile-based crowdsourcing platform by leveraging text messaging.

FIG. 1 illustrates one embodiment of an exemplary system 10 consistent with the present disclosure. As shown, the system 10 includes a server 12 embodied on an internet-based computing system/service. For example, as shown, the server 12 may be embodied on a cloud-based service 14, for example. The server 12 is configured to communicate and share data with one or more users 15(1)-15(n) via user mobile devices 16(a)-16(n) over a network 18. In the present context, the users 15(1)-15(n) may include administrators, customers, or clients of a service provided to one or more remote users via the server 12. The users 15(1)-15(n) may also include particular persons to which the service is directed.

For example, the server 12 may host a crowdsourcing platform for receiving user-driven data related to a particular environment in which users may be located, or otherwise reside, wherein such data may be useful to an owner of the space or for conveying useful information to users within the space. In the embodiments described herein, the server 12 hosts a crowdsourcing platform for providing a Short Message Service (SMS) communication system. The server 12 is configured to receive user-driven data for use in identifying any potential reported issues within an environment and further rely on automated transmittal of command text messages to one or more user mobile devices to elicit location/positioning data, or otherwise train/educate the mobile device to provide location/position data, from the device. The server 12 is configured to correlate the location/positioning data with the reported issues to thereby identify the precise location within the environment in which the reported issue is occurring.

In examples described in greater detail, the environment may include an indoor environment within a building or other structure, such that floor plans of the building may be generated based on user data. It should be noted that the system consistent with the present disclosure may be used for an outdoor environment and is not limited to geolocation services for an indoor environment.

The geolocation service of the present invention may further be useful in building maintenance, wherein the server is configured to collect data from patrons or employees within a space, such as an office space, wherein such data may be related to comfort issues such as HVAC (e.g., temperature of a particular room within a building), building maintenance issues (e.g., lighting issues, cleanliness of facilities, etc.), as well as other aspects of a building or space that may be useful in management of such space. Accordingly, the system of the present invention may be useful with the crowdsourcing platform as described in co-pending and co-owned U.S. patent application Ser. No. 14/328,492, filed Jul. 10, 2014, the contents of which are incorporated herein by reference in their entirety.

Although the following description focuses on an environment within a building or office space, it should be noted that the crowdsourcing platform of the present disclosure is not limited to providing services solely related to comfort or maintenance issues in a building or office space. For example, the crowdsourcing platform may be useful in a consumer-based service application, such as in the food industry or the like in which users may utilize their mobile device to interact with an ordering application to order food-related items to be subsequently picked up by the user or delivered to the user. For example, a restaurant, eatery, or other food-related business, may offer a mobile app that allows a consumer to, via their mobile device, place an order for a food item in advance of their intended arrival to pick up the food item. By incorporating the crowdsourcing platform of the present disclosure, the restaurant or eatery may be able to better estimate the consumer's actual position relative to the location of the establishment, thereby improving the management of processing multiple orders. In particular, by automatically receiving any given consumer's location relative to the location of the restaurant or eatery, the actual processing of the queue of online orders can be better managed so as to better align with the estimated timeframe in which consumers will physically arrive at the establishment to pick up their orders. For example, a consumer who ordered a cup of coffee via their mobile device may be traveling in their vehicle and may encounter traffic on their way to the restaurant to pick up their coffee. The restaurant can receive the actual location of that consumer via the crowdsourcing platform and, based on the location/position data, may alter the queue of orders such that the consumer's cup of coffee may be processed later in the queue than originally intended so as to account for the consumer's delayed arrival. In this manner, other consumers who may be present at the restaurant, or are otherwise not delayed will have their orders processed in a more timely manner, while the consumer arriving later than intended (due to traffic) will have a cup of coffee that processed in accordance with their estimated arrival (i.e., a warm cup of coffee), thereby improving consumer satisfaction and retention.

The system 10 may further include an external computing system/server 22 configured to communicate with at least the cloud-based service 14, and subsequently the server 12, via the network 18. The external computing system/server 20 may be embodied as a remote server, for example, for communicating with the server 12 and for performing the other functions described herein. Similarly, in some embodiments, the server 12 may be embodied on the external computing system/server 22. In the embodiments described herein, the external computing system/server 20 may be embodied as a remote server having one or more databases associated with the server 12, as will be described in greater detail herein.

The network 18 may represent, for example, a communications protocol associated with, or otherwise configured to transmit data associated with, a short message service (SMS). Accordingly, the network 18 may be any network that carries data via SMS protocols. Non-limiting examples of suitable networks that may be used as network 18 include various second generation (2G), third generation (3G), fourth generation (4G) cellular-based data communication technologies, Wi-Fi wireless data communication technology, the internet, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

The network 18 may also represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the mobile devices 16, between the mobile devices 16 and the cloud-based service 14 and/or the external computing device/system/server 22, may be, in whole or in part, a wired connection.

It should be noted that the systems and platform described herein may utilize other communication standards and may not rely solely on SMS for the transmission of messages. For example, in some embodiments, in addition, or alternatively, to communicating text messages, the server 12 of the present invention may be configured to utilize multimedia messaging service (MMS) for the transmission and receipt of multimedia content (e.g., images, video, audio, etc.). Accordingly, the platform of the present invention may further allow for the sending and receiving of multimedia content, in addition to text messages, to and from participants. It is further contemplated that other messaging channels may also be provided by a platform of the present invention (e.g., social media messaging applications and the like).

As shown, in an aspect of the present invention, data and other information and services are, for example, input by one or more users 15 (shown as users 15a-15n) and received by one or more associated mobile devices 16 (shown as mobile devices 16a-16n). The mobile devices 16 are configured to be communicatively coupled to the cloud-based service 14 and/or external device, system or server 22 via the network 18. In addition, or alternatively, the mobile devices 16 are configured to be communicatively coupled to one another via the network 18. In some embodiments, user data may be passively transmitted to the server 12 (e.g., data captured by one or more sensors on the mobile device 16 may be automatically transmitted to the server 12).

The server 12 is configured to communicate and share data with the mobile devices 16 associated with one or more users 15. Accordingly, the mobile device 16 may be embodied as any type of device for communicating with the server 12 and cloud-based service 14, and/or other user devices over the network 18. For example, at least one of the user devices may be embodied as, without limitation, a computer, a desktop computer, a personal computer (PC), a tablet computer, a laptop computer, a notebook computer, a mobile computing device, a smartphone, a cellular telephone, a handset, a messaging device, a work station, a distributed computing system, a multiprocessor system, a processor-based system, and/or any other computing device configured to store and access data, and/or to execute software and related applications consistent with the present disclosure. In the embodiments described here, the mobile device 16 is generally embodied as a smartphone having one or more sensors for capturing various data related to at least one of user movement, user location, signals outputted from or received by the mobile device 16, and the like.

Figure 2:
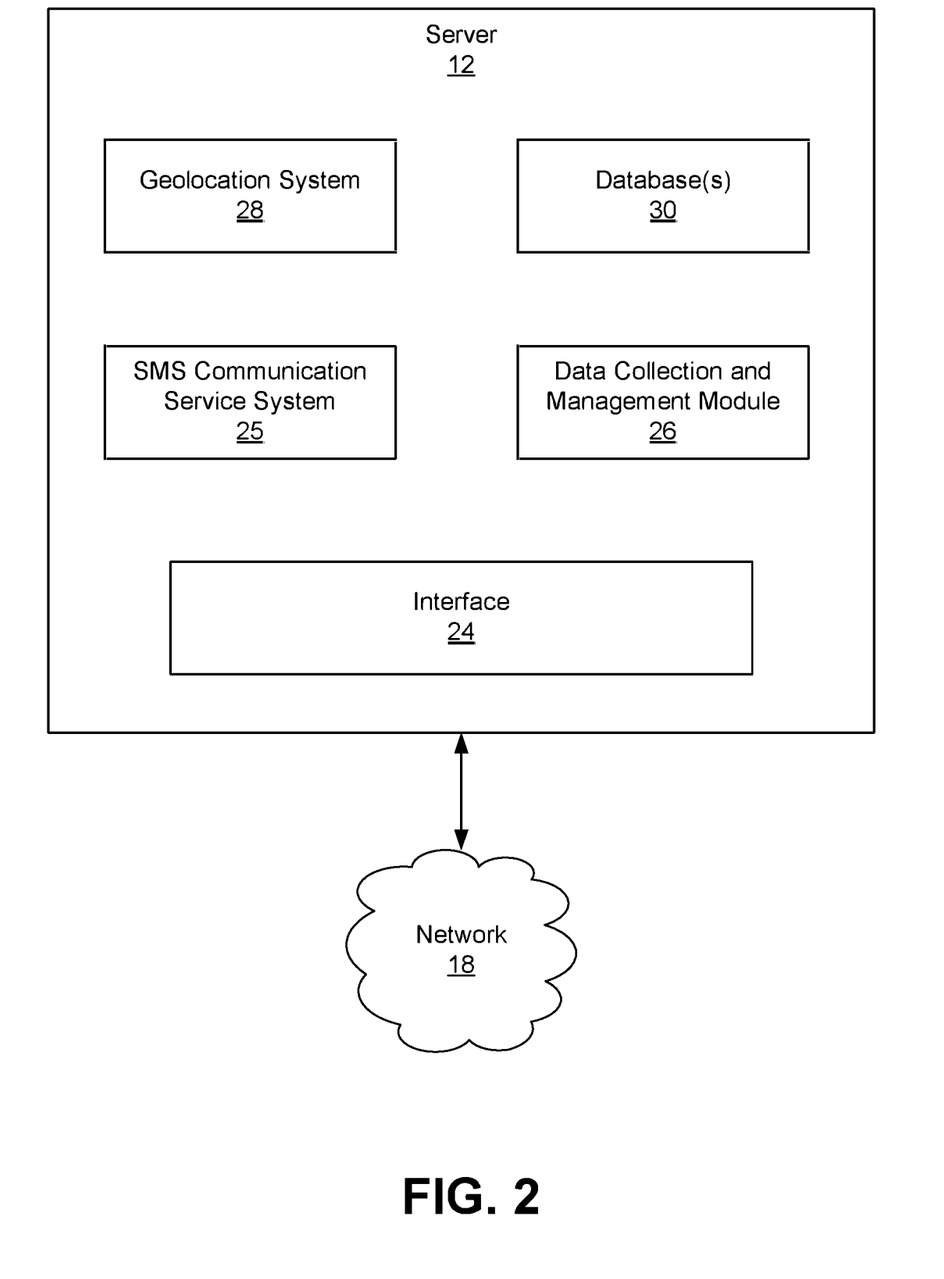
FIG. 2 is a block diagram illustrating the server of FIG. 1 in greater detail.

FIG. 2 is a block diagram illustrating the server 12 in greater detail. As shown, the server 12 may include an interface 24, a SMS communication service system, a data collection and management module 26, a geolocation system 28, and one or more databases 30 for data related data received from the mobile devices 16. For example, the data collection and management module 26 may be configured to communicate and exchange data with at least the SMS communication service system and geolocation system 28, and one or more databases 30, each of which is described in greater detail herein.

The interface 24 may generally allow a user (e.g., an authorized user 15) to access data on the server 12. For example, upon accessing the server 12 on the cloud-based service 14, the interface 24 may be presented to the user via their device 16, in which the user may navigate a dashboard or standard platform interface so as to access data (stored in the databases 30) collected from other users and their associated mobile devices. For example, in the event that the service provided is the crowdsourcing platform for comfort or building maintenance issues within an building, certain users may access the data collected from users within the building, such as reported issues within the building (e.g., room too hot, room too cold, lights are broken, etc.).

Figure 3:
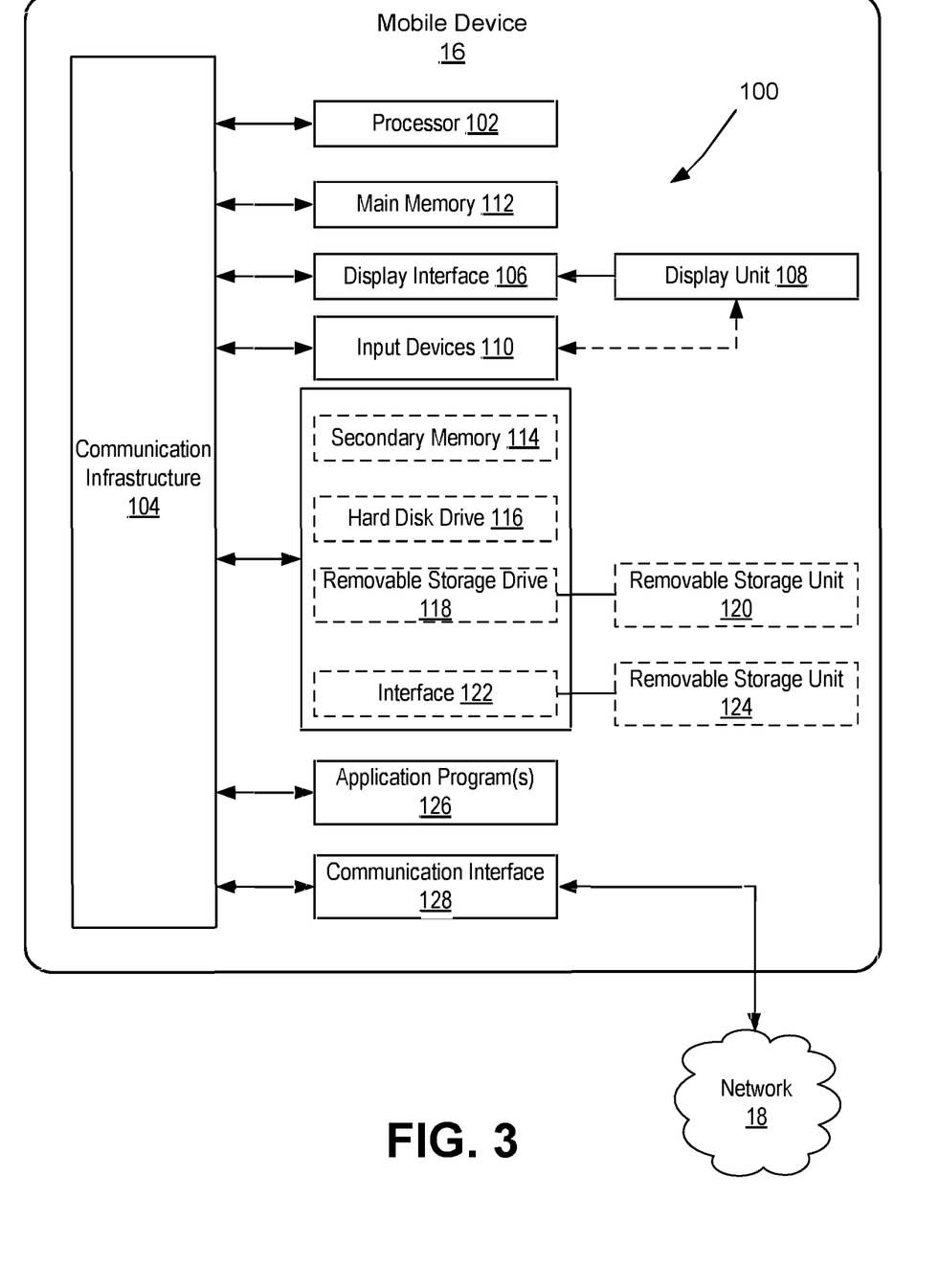
FIG. 3 is a block diagram illustrating at least one embodiment of a mobile device for text message communication and providing location/positioning data of a user consistent with the present disclosure.

FIG. 3 is a block diagram illustrating at least one embodiment of a mobile device 16 for communicating with the server 12 and providing data related to user location and/or movement consistent with the present disclosure. The mobile device 16 generally includes a computing system 100. As shown, the computing system 100 includes one or more processors, such as processor 102. Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a frame buffer not shown) for display on display unit 108. The computing system further includes input devices 110. The input devices 110 may include one or more devices for interacting with the mobile device 16, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 16, such as accessing and interacting with applications executed on the device 16, including an app for providing direct user input with the building comfort or maintenance services offered by a crowdsourcing platform.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the mobile device 16 may maintain one or more application programs, databases, media and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task.

The computing system 100 further includes a communications interface 128. The communications interface 128 may be embodied as any communication circuit, device, or collection thereof, capable of enabling communications between the mobile device 16 external devices (other mobile devices 16, the cloud-based service 14, and the external computing system/server 22). The communications interface 128 may be configured to use any one or more communication technology and associated protocols, as described above, to effect such communication. For example, the communications interface 128 may be configured to communicate and exchange data with the server 12, the external computing system/server 22 and/or one other mobile device 16 via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of June 2015, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the mobile device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented using software, the software may be stored in a computer program product and loaded into the computing system 100 using removable storage drive 118, hard drive 116 or communications interface 128. The control logic (software), when executed by processor 102, causes processor 102 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 4:
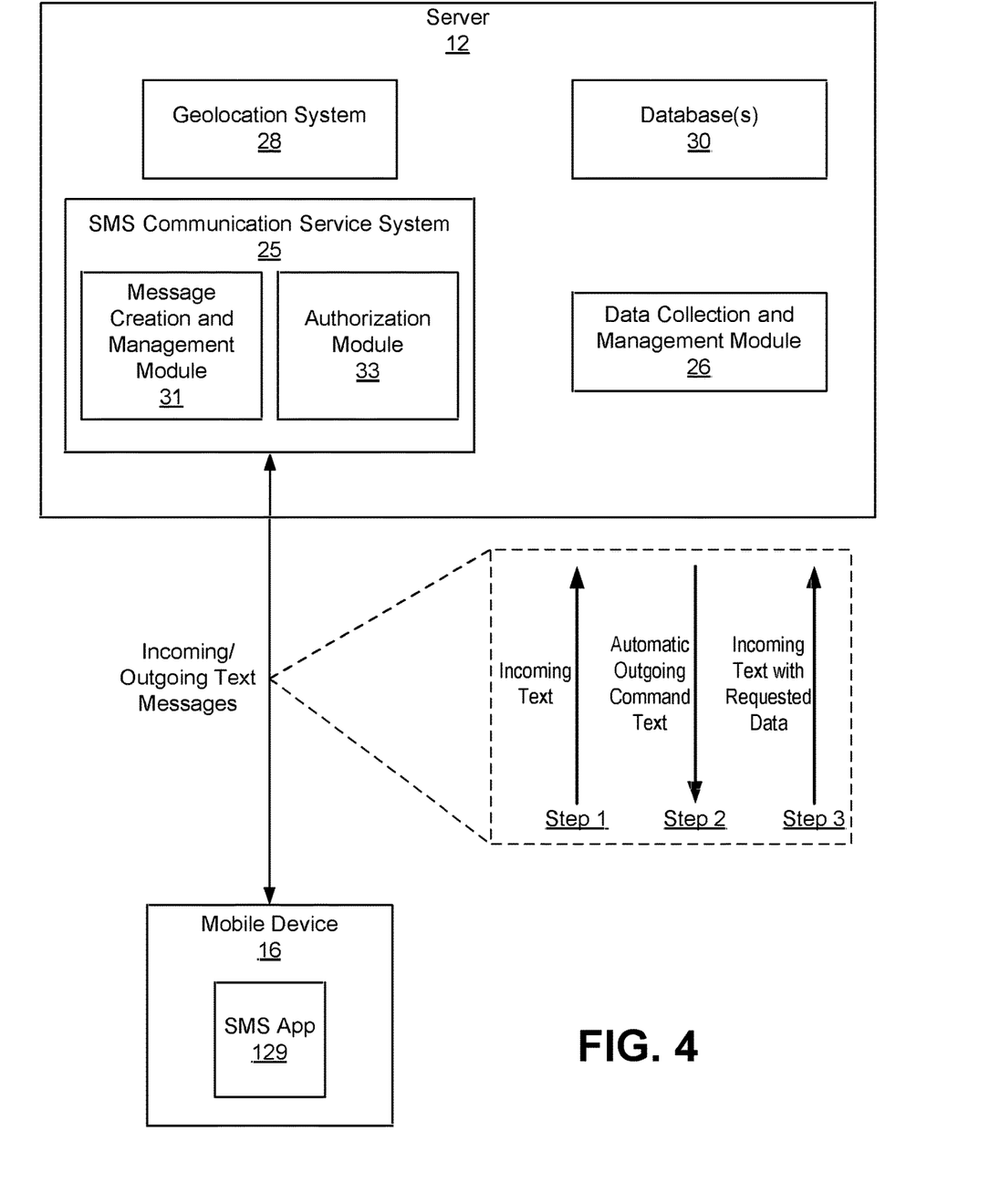
FIG. 4 is a block diagram illustrating the SMS communication service system provided by a server consistent with the present disclosure in greater detail and further illustrates collection of location/positioning data from a user's mobile device in response to a command text message.

FIG. 4 is a block diagram illustrating the SMS communication service system 25 in greater detail. FIG. 4 further illustrates the exchange of text messages between the SMS communication service system 25 and mobile device 16 for the automatic and passive collection of location/positioning data from the user's mobile device. As shown, the SMS communication service system 25 includes a message creation/management module 31 configured to provide certain authorized users or clients with a means of creating or editing one or more outgoing command text messages. The SMS service system 25 further includes an authorization module 33 configured for managing profiles of one or more users or clients authorized to access the system 25 (e.g., for the purpose of creating or editing outgoing command text messages) and to further manage authority over the system 25 so as to effectively manage outgoing command text messages to ensure they are only being sent to subscribing users that have subscribed to the service and agreed to receive such messages.

The cornerstone of the SMS communication service system 25 is the ability to schedule one or more command text messages to be sent to a user's mobile device in response to an initial incoming text message from the user. For example, one or more users may generally be required to subscribe to a service provided by the crowdsourcing platform. By subscribing to the service, the users are agreeing to allow the platform to obtain certain data from their mobile device 16, which, in the present scenario, includes location/positioning data. Accordingly, in the event that the service to which a user subscribes relates to building comfort or maintenance, the user may be presented with an app on their device 16 with which they can interact to report comfort or maintenance issues within a building. For example, in the industry of building maintenance and services, the platform is configured to collect data from patrons or employees within a space, such as an office space, wherein such data may be related to comfort issues such as HVAC (e.g., temperature of a particular room within a building), building maintenance issues (e.g., lighting issues, cleanliness of facilities, etc.), as well as other aspects of a building or space that may be useful in management of such space.

Alternatively, in the event that the service to which a user subscribes relates to a food or product ordering service, the user may be presented within an app on their device 16 with which they can interact to order food-related items to be subsequently picked up by the user or delivered to the user. For example, in the food service industry, the platform is configured to collect data from consumers that may include GPS location/position data relative to a specific restaurant or eatery from which they are ordering food for pickup.

As part of the subscription process, the authorization module 33 may be configured to receive user input and compare the user input with data stored in a user database, for example, in order to determine whether the user has subscribed to the service (i.e., signed up to interact with the service and further agreeing to receive command text messages from the service and passively provide data to the service in return). For example, as part of the authentication and access architecture, the authorization module 32 is configured to screen a user attempting to use the service via an SMS app 129 on their phone by verifying the credentials of the user and determining whether they are a subscriber (e.g., registered with the system 25. The verification process may include a typical login scenario in which a user must log in to the service 25 by providing credentials (e.g., username, password, etc.), wherein the authorization module 33 will compare the credentials with the subscriber profiles to determine if the user has a profile and has further agreed to the terms and conditions of the service 25 (e.g., agreed to receive command text messages and allow data from their mobile device to be transmitted back to the service).

Thus, in the building comfort and maintenance scenario, a user may initially use their device 16 to report that a room is "too hot". Alternatively, in the food ordering service scenario, a user may initially use their device 16 to place an order with a subscribing restaurant or eatery. The device 16 may include an SMS app 129 configured to provide the user with the ability to generate and transmit an incoming text message to the server 12 to be received by the SMS communication service system 25 (step 1). Upon receiving the incoming text message, the system 25 may be configured to automatically transmit a command text message to the user's mobile device 16 (step 2). The command text message is generally configured to ping the user's mobile device 16 for specific data, as configured by the message creation/management module 31. For example, the command text message may be configured to command the user's mobile device to generate and send a response text message back to the server 12 (step 3). The response text message may include, for example, location/positioning data. Accordingly, upon receiving the location/positioning data, the geolocation system 28 may correlate and tie the location/positioning data with the user's initial text message (e.g., reporting text message of "too hot" or the online order) so as to accurately tie the user's comment to a specific location in which the user and mobile device is located at the time the initial reporting text message was sent.

Figure 5:
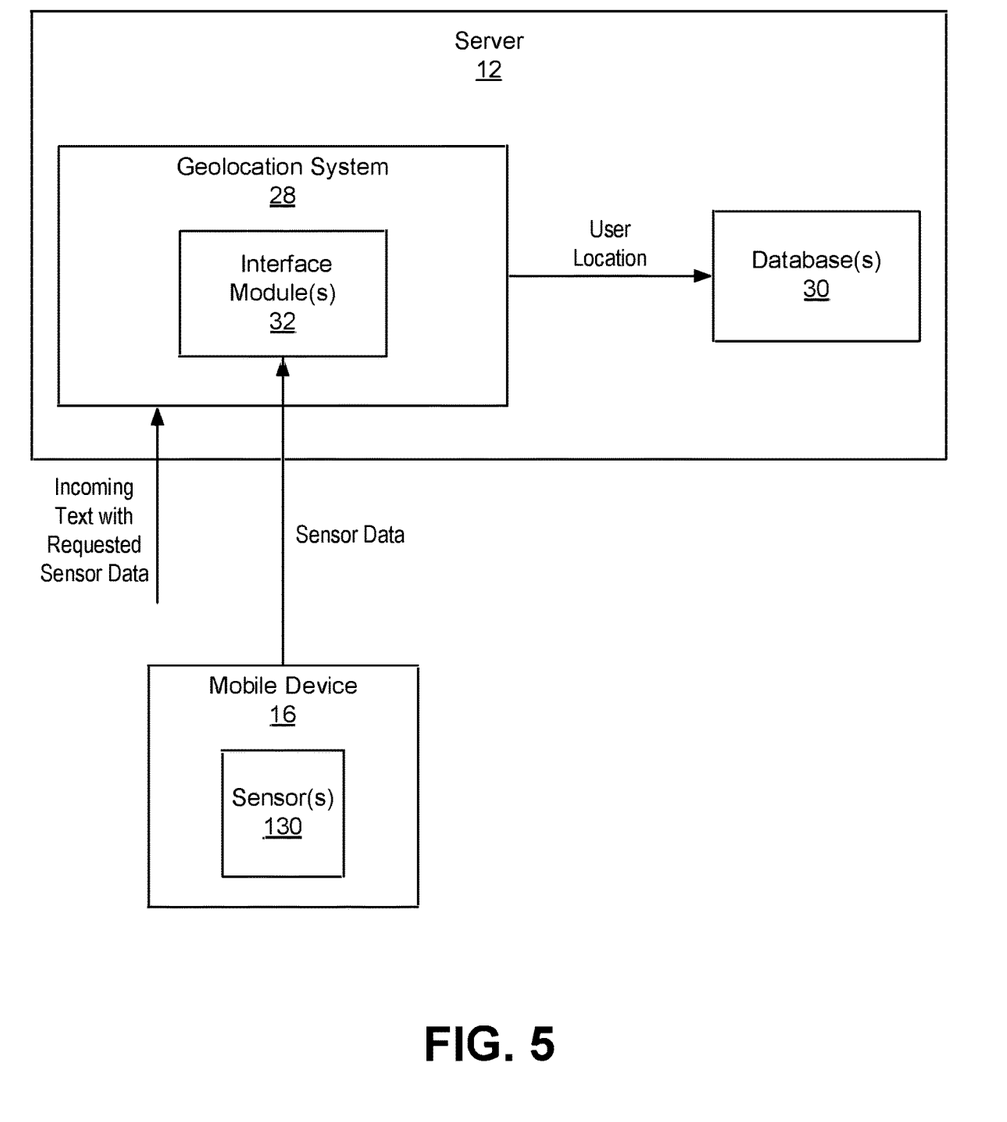
FIG. 5 is a block diagram illustrating a geolocation system provided by a server consistent with the present disclosure in greater detail.

FIG. 5 is a block diagram illustrating the geolocation system 28 in greater detail. As shown, the geolocation system 28 may include one or more interface modules 32. As will be described in greater detail herein, the geolocation system (by way of module 32) is configured to receive the user data from the mobile device 16 related to user location and/or movement within an environment and further correlate said location/position data to at least a user's reported issue so as to provide an accurate location of the reported issue within the environment without require active input from the user.

The one or more interface modules 32 are generally configured to receive sensor data captured by one or more sensors 130 of the mobile device 16 as provided by the incoming text message from the mobile device 16 in response to the command text message. Upon analyzing the sensor data, the one or more interface modules 32 are configured to generate user location/positioning data and correlate such data with the issue report.

Figure 6:
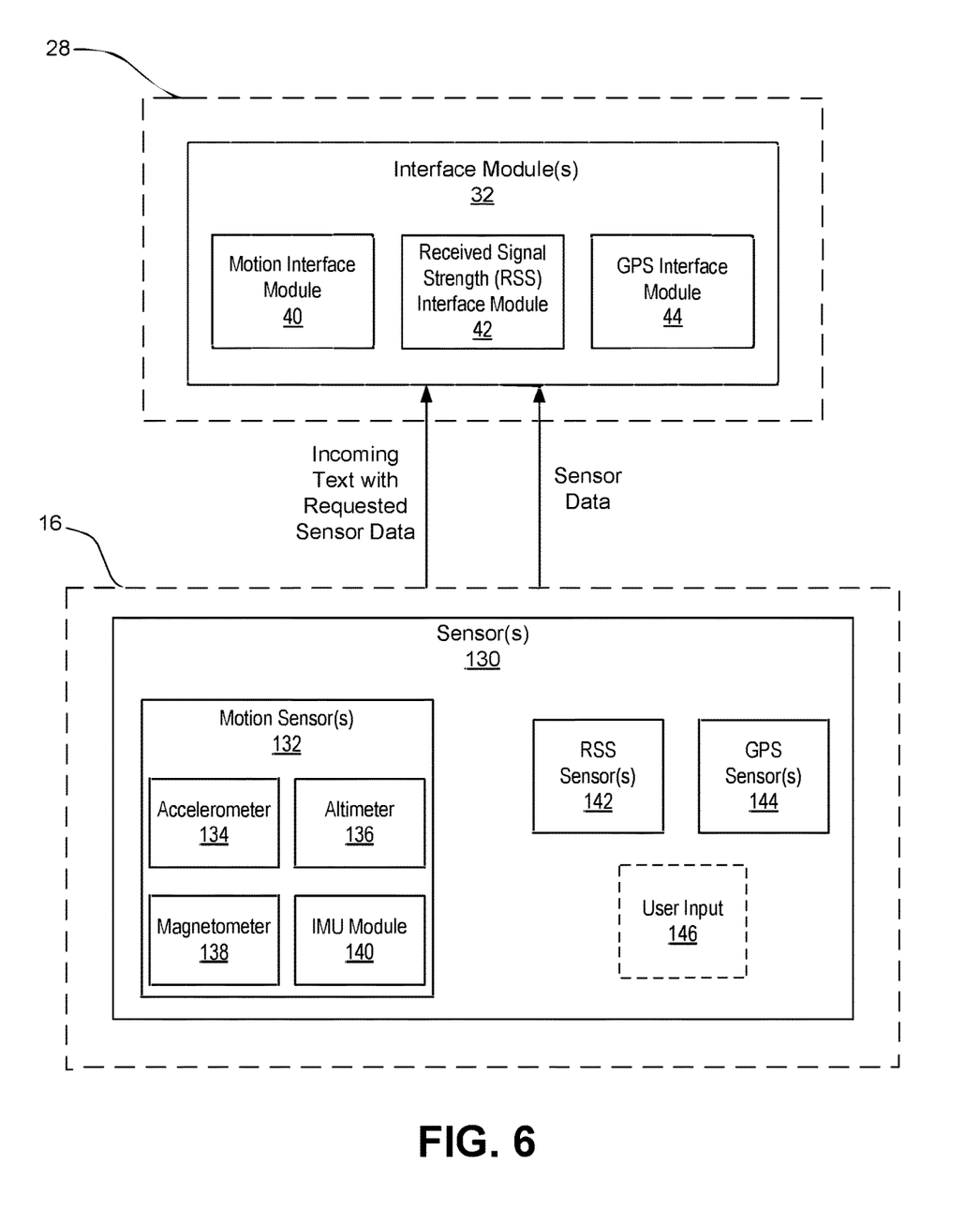
FIG. 6 is a block diagram illustrating collection of location/positioning data from one or more sensors of a mobile device and subsequent analysis of such data by interface modules of the geolocation system.

FIG. 6 is a block diagram illustrating collection of sensor data captured by one or more sensors 130 of the mobile device 16 and subsequent analysis of such data by interface modules 32 of the geolocation system 28. As shown, the mobile device 16 may include a variety of different sensors configured to capture data related to motion or position of the mobile device 16 and/or signals transmitted from the mobile device 16. The sensors 130 may further be configured to capture user input, such as touch input and the like. As shown, the sensors 130 may include one or more motion sensors 132, a received signal strength (RSS) sensor 142, and a GPS sensor 144.

It should be noted that FIG. 6 illustrates one embodiment of set of sensors included in a mobile device consistent with the present disclosure and by no means is meant to limit the kind and/or amount of sensors for use in a system and/or method consistent with the present disclosure. For example, a system and method consistent with the present disclosure may include more or less sensors than what is illustrated in FIG. 6.

The one or more motion sensors 132 may be embodied as any type of sensor configured to capture motion data and produce sensory signals from which the geolocation system 28 may determine the user position and/or movement with the mobile device 16. In particular, the motion sensor 132 may be configured to capture data corresponding to the movement of the user device 16 or lack thereof. The motion sensor 132 may include, for example, an accelerometer 134, an altimeter 136, one or more gyroscopes, or other motion or movement sensor to produce sensory signals corresponding to motion or movement of the device 16 and/or a magnetometer 138 to produce sensory signals from which direction of travel or orientation can be determined. The one or more motion sensors 132 may further include, or are coupled to, an inertial measurement unit (IMU) 140 for example.

The motion sensors 132 may also be embodied as a combination of sensors, each of which is configured to capture a specific characteristic of the motion of the device 16, or a specific characteristic of user movement. A motion sensor embodied as a combination of sensors may use algorithms, such as, for example, fusion algorithms, to correct and compensate the data from individual sensors and provide more robust motion sensing and detection context than each individual sensor can provide alone.

The RSS sensor 142 is generally configured to capture signal strength of the mobile device 16, which may be used to determine the distance between stations, as signal strength is usually related to the distance via a path-loss model which predicts the received signal strength at any specific distance based on the transmit power, signal attenuation gradient (known as path-loss exponent), number of attenuators and their respective attenuation level, and the distance to the stations. The GPS sensor 144 is configured to capture location data (e.g. coordinates) of the mobile device 16. In some embodiments, a system clock may be used and configured to determine date and time of day of the user device 16, wherein such data may be transmitted to the geolocation system 28.

As shown, the geolocation system 28 includes interface modules 32 configured to process and analyze data captured from corresponding sensors 130 to determine user position or movement based on analysis of the captured data. In the illustrated embodiment, the geolocation system 28 includes a motion interface module 40 configured to receive and analyze data captured by the one or more motions sensors 132, a RSS interface module 42 configured to receive and analyze data captured by the RSS sensor 142, and a GPS interface module 44 configured to receive and analyze data captured by the GPS sensor 144.

The motion interface module 40 is configured to receive motion data captured by the one or more motion sensors 132. Upon receiving the motion data from the one or more motion sensors 132, the motion interface module 40 may be configured to identify movement of the device 16 such as, for example, the direction of movement, location of the device 16 within a particular plot, magnitude of movement of the device 16, which may indicate user location/movement when combined with analyzing of RSS data and GPS data by the RSS and GPS interface modules 42, 44. The motion interface module 40 may include custom, proprietary, known and/or after-developed motion detection code (or instruction sets) that are generally well-defined and operable to identify a motion event.

As previously described, in some embodiments, direct user input 146 may be received (e.g., users be prompted to verify their location or movement, as well as specific landmarks or objects within the vicinity) so as to improve the degree of certainty of a user's position or movement within a space.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for leveraging text messages to manage a service in a mobile-based crowdsourcing platform, the system comprising:
a server system configured to communicate with and exchange SMS text message data with a mobile device, the server comprising at least one hardware processor coupled to at least one non-transitory computer-readable memory containing instructions executable by the at least one processor to cause the server system to:
receive an initial text message from the mobile device, the initial text message comprising user-driven data relating to the service;
generate and transmit at least one command text message to the mobile device, each command text message causing the mobile device to automatically generate and transmit a response text message to the server system comprising data associated with a current location or position of the mobile device;
determine an estimated time of arrival of the mobile device at a service location based on the current location from at least one response text message;
generate and transmit a follow-up text message to the mobile device prompting the user for direct user input relating to the service including at least verifying user location or movement as well as verifying a landmark or object in the vicinity of the user;
update the estimated time of arrival based on the direct user input; and
manage provisioning of the service based on the initial text message and the updated estimated time of arrival.

2. The system of claim 1, wherein the mobile device runs a mobile application ("app") that generates and transmits the initial text message and each response text message, the mobile application providing a user interface for the service.

3. The system of claim 1, wherein the follow-up text message identifies the landmark or object.

4. The system of claim 3, wherein the follow-up text message prompts the user to verify the estimated time of arrival.

5. The system of claim 1, wherein the service relates to user comfort at the service location.

6. The system of claim 1, wherein the service relates to maintenance at the service location.

7. The system of claim 1, wherein the service relates to a product at the service location.

8. The system of claim 1, wherein the service is a consumer-based service.

9. The system of claim 1, wherein managing provisioning of the service based on the initial text message and the estimated time of arrival comprises scheduling the service based on the updated estimated time of arrival.

10. The system of claim 1, wherein the data associated with the location or position of the mobile device is data captured by one or more sensors of the mobile device.

11. A method for leveraging text messages to manage a service in a mobile-based crowdsourcing platform, the method comprising:
receiving, by a server system of the crowdsourcing platform, an initial text message from the mobile device, the initial text message comprising user-driven data relating to the service;
generating and transmitting, by the server system, at least one command text message to the mobile device, each command text message causing the mobile device to automatically generate and transmit a response text message to the server system comprising data associated with a current location or position of the mobile device;
determining, by the server system, an estimated time of arrival of the mobile device at a service location based on the current location from at least one response text message;

generating and transmitting a follow-up text message to the mobile device prompting the user for direct user input relating to the service including at least verifying user location or movement as well as verifying a landmark or object in the vicinity of the user;

updating the estimated time of arrival based on the direct user input; and managing, by the server system, provisioning of the service based on the initial text message and the updated estimated time of arrival.

12. The method of claim 11, wherein the mobile device runs a mobile application ("app") that generates and transmits the initial text message and each response text message, the mobile application providing a user interface for the service.

13. The method of claim 11, wherein the follow-up text message identifies the landmark or object.

14. The method of claim 13, wherein the follow-up text message prompts the user to verify the estimated time of arrival.

15. The method of claim 11, wherein the service relates to user comfort at the service location.

16. The method of claim 11, wherein the service relates to maintenance at the service location.

17. The method of claim 11, wherein the service relates to a product at the service location.

18. The method of claim 11, wherein the service is a consumer-based service.

19. The method of claim 11, wherein managing provisioning of the service based on the initial text message and the updated estimated time of arrival comprises scheduling the service based on the estimated time of arrival.

20. The method of claim 11, wherein the data associated with the location or position of the mobile device is data captured by one or more sensors of the mobile device.

* * * * *